United States Patent [19]

Saji

[11] Patent Number: 5,706,340
[45] Date of Patent: Jan. 6, 1998

[54] TELEPHONE APPARATUS INCLUDING CIRCUIT FOR PRODUCING DIAL DATA FROM SERIAL KEY DATA

[75] Inventor: Mitsuro Saji, Kyoto, Japan

[73] Assignee: Rohm Co., Ltd., Kyoto, Japan

[21] Appl. No.: 358,760

[22] Filed: Dec. 19, 1994

[30] Foreign Application Priority Data

Dec. 22, 1993 [JP] Japan .................................. 5-346301
Dec. 24, 1993 [JP] Japan .................................. 5-347682

[51] Int. Cl.$^6$ .......................... H04M 1/00; H03M 11/00
[52] U.S. Cl. ........................ 379/353; 341/22; 379/357; 379/361; 379/362; 379/368; 379/369; 379/387; 379/413
[58] Field of Search ................................ 379/413, 387, 379/361, 353, 360, 324, 368, 369, 362, 357; 341/22

[56] References Cited

U.S. PATENT DOCUMENTS

| 4,008,380 | 2/1977 | La Borde | 379/354 |
| 4,232,200 | 11/1980 | Hestad et al. | 379/35 |
| 4,389,547 | 6/1983 | Jansen et al. | 379/188 |
| 4,598,174 | 7/1986 | Pommer, II | 379/353 |
| 4,642,810 | 2/1987 | Picard | 375/37 |
| 4,675,653 | 6/1987 | Priestley | 340/365 S |
| 5,220,597 | 6/1993 | Horiuchi | 379/362 |
| 5,241,591 | 8/1993 | Saji | 379/361 |
| 5,459,462 | 10/1995 | Venkidu et al. | 341/22 |

FOREIGN PATENT DOCUMENTS

4-37351  2/1992  Japan.

*Primary Examiner*—Harry S. Hong
*Attorney, Agent, or Firm*—Fay, Sharpe, Beall, Fagan, Minnich & McKee

[57] ABSTRACT

A serial data generating circuit and a key input signal generating circuit are provided at a panel substrate side, and input key data are transmitted in series to a main substrate side of a telephone apparatus. The number of signal lines connected between the panel substrate and the main substrate are reduced. Further, on the main substrate side downstream of a selection circuit, a data converting and producing circuit which converts the serial input key data into parallel dial data is provided to permit switching of the signal source between a processor and the panel substrate to thereby enable a dial call origination even during a power failure condition.

7 Claims, 4 Drawing Sheets

TELEPHONE APPARATUS INCLUDING CIRCUIT FOR PRODUCING DIAL DATA FROM SERIAL KEY DATA

BACKGROUND OF THE INVENTION

1. Field of Application

The present invention relates to a telephone apparatus and, more specifically, relates to an easily-produced telephone apparatus having a built-in microcomputer such as a multi function type telephone set including, for example, a compacted call originating function, an answering machine function, and a wireless operating function; and an applied telephone apparatus, for example, a facsimile machine, in which the number of internal wirings is reduced and disconnection and failure are limited and which can be produced easily.

2. Description of Background Art

In response to a demand requiring addition of many kinds of functions, recent telephone sets, applied telephone apparatus such as facsimile machines, and the like are provided with a built-in microcomputer (a controller such as a CPU, MCU, or MPU), and on their operation panels many kinds of function keys are provided in addition to the ten dialing keys. Further, on some of their operation panels a liquid crystal display device (hereinbelow simply called an LCD) and the like are mounted.

Because of such construction, on the back side of the operation panel there is provided a circuit substrate (hereinbelow called a panel substrate) for mounting such as the LCD and the key board, and on another circuit substrate (hereinbelow called a main substrate) in the apparatus main body a microcomputer, a dial pulse generating circuit (hereinbelow simply called a DP generating circuit), a dual tone multi frequency signal generating circuit (hereinbelow simply called a DTMF generating circuit), memory and the like are provided. Accordingly, during their assembly, connection work of the panel substrate and the main substrate is necessitated.

However, in these types of apparatus depending upon an increase of many kinds of function keys, the number of wirings from the panel substrate to the main substrate is increasing, for which connection work requires many man-hours. In particular, since the ten keys and the like are arranged in a matrix shape, a plurality of keys are arranged in longitudinal and lateral directions, for example, one of the following manners: 4×3, 4×4 and recently 5×5. The wiring of the signal lines thus numbers up to 8 or more and sometimes exceeds 10. Moreover, in the telephone apparatus mounting the LCD on the panel substrate side, the wiring to the LCD is further added.

The increase of the wiring number brings about problems such as poor contact, disconnection and failure, and further raises such drawbacks as an increase of production steps and of production hours. In particular, for handheld telephone apparatus and the like which require down sizing and light weight the increase of the wiring number is an obstacle to the down sizing.

Moreover, since the telephone apparatus has to operate on electric power from the telephone line so as to permit a dial call origination even during power failure, the telephone apparatus is required to have a controller such as a CPU or MCU which is driven at as low a voltage and with as limited a power consumption as possible.

Further, JP-A-4-37351(1992) assigned to the present assignee discloses a telephone apparatus which is designed to generate dial data without operating the CPU during power failure.

SUMMARY OF THE INVENTION

An object of the present invention is to provide a telephone apparatus in which the number of internal wirings is reduced and disconnection and failure are limited, and which can be produced easily.

Another object of the present invention is to provide a telephone apparatus mounting a display device with a limited disconnection and failure which permits a dial call origination without operating a controller such as a CPU or MPU during power failure, and suppresses the operation electric power a during power failure.

The constitution of the telephone apparatus according to the present invention which achieves the above objects comprises:

- a key board including ten dial keys and symbol keys;
- a serial data generating circuit which generates serial input data corresponding to inputted keys on the key board in response to clock pulses;
- a key input signal generating circuit which generates a key input signal (key depressed signal) representing an input through a key in response to a signal from the key board;
- a panel substrate provided with the serial data generating circuit and the key input signal generating circuit;
- a clock generating circuit which generates the clock pulses;
- a processor which receives the clock pulses, the key input signal and the input data and outputs in parallel a serial key data and control signals produced in response to the input data and the clock pulses or other clock pulses generated in response to the clock pulses;
- either a DP generating circuit or a DTMF generating circuit;
- a selection circuit which receives the clock pulses from the clock generating circuit, the key input signal or the signal corresponding thereto, the input data and the parallel output signals from the processors, and outputs the parallel signals in parallel during normal operation, and further outputs the clock pulses from the clock generating circuit, the key input signal or the signal corresponding thereto and the input data in parallel during a power source interruption;
- a data converting and producing circuit which produces dial data from the parallel output signals from the selection circuit;
- a main substrate provided with the processor, either the DP generating circuit or the DTMF generating circuit, the selection circuit and the data converting and producing circuit;
- wirings through which the clock pulses, the key input signals and the input data are inputted in parallel to the selection circuit and the processor respectively; and
- a power source circuit which supplies electric power from the telephone line to either the DP generating circuit or the DTMF generating circuit, the clock generating circuit, and the data converting and producing circuit on the main substrate and the panel substrate.

Since the serial data generating circuit and the key input signal generating circuit are provided at the panel substrate side and the input key data are transmitted in series to the main substrate side, the number of signal lines connected between the panel substrate and the main substrate are reduced. Further, on the main substrate side downstream of the selection circuit, the data converting and producing circuit which converts the serial input key data into the parallel dial data is provided and is designed to switch the signal source between the processor and the panel substrate. The signals from the panel substrate can be directly received thereby during a power source interruption or power failure, which eliminates the need for the processor to operate. As a result, the power consumption during a power source interruption such as a power failure can be limited. Further, since the number of signal lines is reduced, the possibility of disconnection and failure thereof is reduced and a telephone apparatus which can be easily manufactured is realized.

During the normal operation, upon receipt of the input key data the processor first of all produces a complete dial signal (serial key data) from a compacted dial signal (input data), performs processings corresponding to many kinds of additional functions relating to the inputted keys and outputs serial key data corresponding to the keys on the key board in response to the processings. Further, since the present telephone apparatus can perform a dial call origination during a power failure without operating the processor, a controller such as a low cost and general purpose CPU, MCU or MPU can be used as the processor.

DESCRIPTION OF THE PREFERRED EMBODIMENTS

Figure 1:
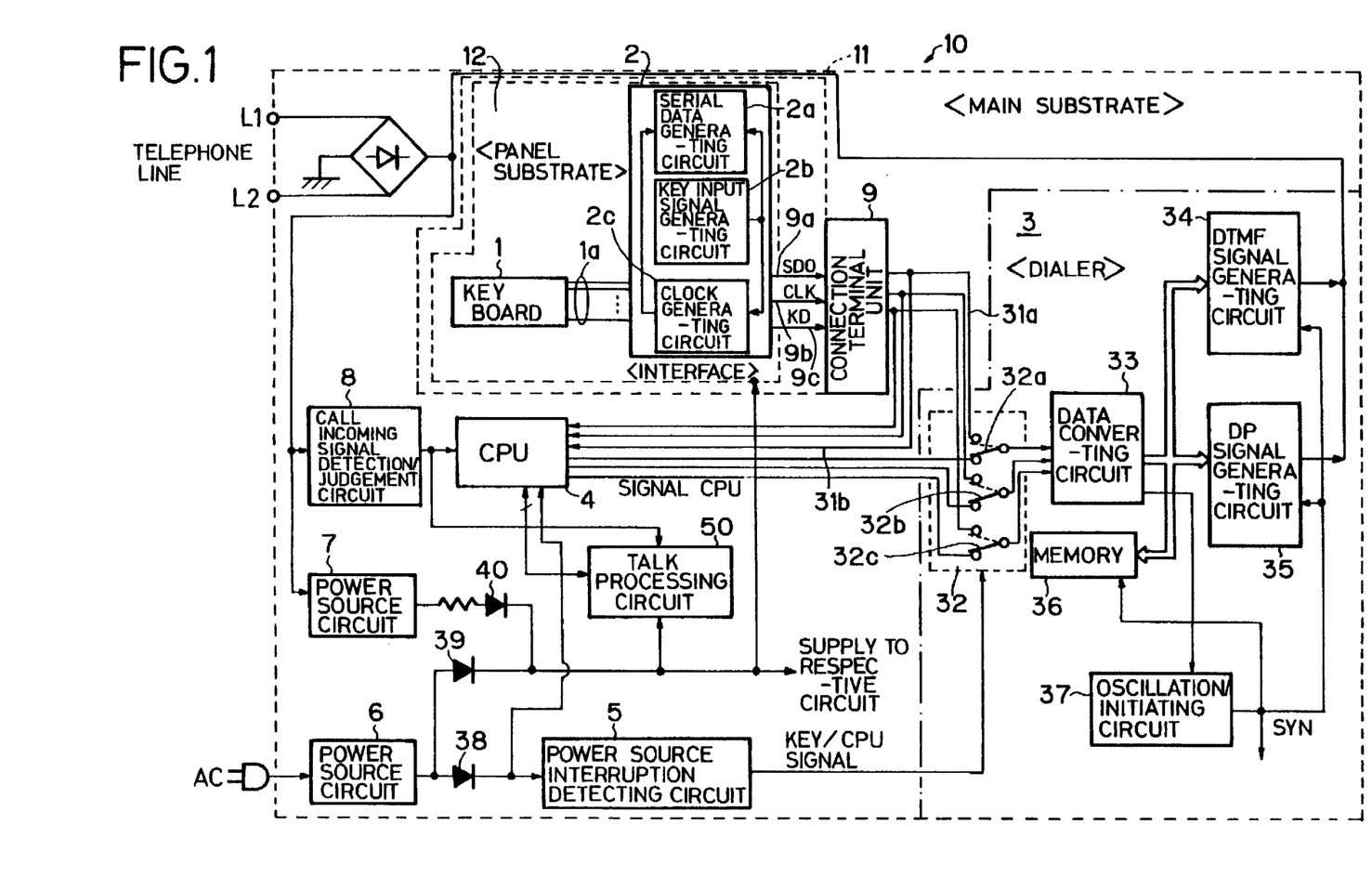
FIG. 1 is a block diagram of one embodiment to which the telephone apparatus according to the present invention is applied.

In FIG. 1, numeral 10 is a telephone apparatus, 11 a main substrate thereof, and 12 a panel substrate provided at the back side of an operation panel. On the main substrate 11 are provided a dialer 3 which generates a telephone line connection signal for a telephone exchange, a controller (hereinbelow simply called a CPU) 4 constituted principally by a CPU which functions as a processor for producing many kinds of corresponding key data in response to input key data and for controlling the apparatus, a power source interruption detecting circuit 5, a power source circuit 6 which supplies electric power principally to the CPU 4 during normal operation, and another power source circuit 7 which supplies electric power from telephone lines L1 and L2 to internal circuits and the like. Further, a key board 1 and an interface 2 are mounted on the panel substrate 12, and on the key board 1 keys of 4×4 consisting of ten keys and symbol keys are arranged.

A serial data generating circuit 2a provided in the interface 2 produces input key data SDO in connection with an inputted key on the key board 1 according to clock pulses generated from a clock generating circuit 2c, and outputs the same to a signal line 9a. The clock generating circuit 2c generates clock pulses CLK for transferring the input key data and outputs the same to the serial data generating circuit 2a and a signal line 9b. When a key on the key board 1 is depressed, a key input signal generating circuit 2b detects the key depression and outputs a key depression pulse KD. The key depression pulse signal KD is sent to a signal line 9c, the serial data generating circuit 2a and the clock generating circuit 2c, and functions as a driving signal for these circuits.

wirings 1a transmit signals from the key board 1 to the interface 2, and are constituted by a cluster of at least eight lines and sometimes more than ten lines. On the other hand, the three signal lines 9a–9c directing from the interface 2 to the main substrate 11 are connected to a connection terminal unit 9 provided at the main substrate side including parallel terminals for the three signals.

The dialer 3 is constituted by wiring portions 31a and 31b for the three signals in parallel to be connected to the connection terminal unit 9, a switching circuit 32 which performs switching of an input signal by a unit of three signals in parallel, a data converting circuit 33, a DTMF generating circuit 34, a DP generating circuit 35, a memory 36 and an oscillation and initiating circuit 37. Data of three signals in parallel are sent from the connection terminal unit 9 via the wiring portion 31b to the CPU 4 as well as to the switching circuit 32 via the wiring portion 31a. The switching circuit 32 selects one of the data of three parallel signals from the CPU 4 and the data of three parallel signals from the connecting terminal unit 9. The switching circuit 32 is a selector constituted by three switches 32a, 32b and 32c having two input terminals and one output terminal provided for the three parallel signals, and is designed to output a selected input signal to the data converting circuit 33. The data converting circuit 33 receives data of three parallel signals from the switching circuit 32, produces key data corresponding to the signals SDO received from the CPU 4 or dial data including four bit numeral codes corresponding to the ten keys from 0 through 9 and four bit symbol codes corresponding to the symbol keys such as "*" and "#" according to the signals SDO received from the interface 2 among the received data of three parallel signals, and sends out the same to memory 36, the DTMF generating circuit 34 and the DP generating circuit 35. Further, immediately before the generation timing of the dial data, the oscillation/initiating circuit 37 is initiated to generate a synchronous clock pulse SYN for operating the DTMF generating circuit 34, the DP generating circuit 35 and the memory 36, and activates the same.

The DTMF generating circuit 34 produces a transmission signal formed by combining tone signals of high and low frequency components in response to the synchronous clock pulse SYN and based on the inputted dial data, and outputs as a DTMF signal to the telephone lines L1 and L2. The DP generating circuit 35 produces a dial pulse in response to the synchronous clock pulse SYN and based on the inputted dial data, and outputs the DP signal to the telephone lines L1 and L2. Further, either the DTMF generating circuit 34 or the DP generating circuit 35 is connected in advance to the telephone lines L1 and L2 by a manually operable selection switch (not shown), and either the DTMF signal or the DP signal is sent out to the telephone lines L1 and L2.

In the present embodiment, the switching circuit 32 is switched to the side of the CPU 4 during normal operation and sends out the signals from the CPU 4 to the data converting circuit 33. The memory 36 temporarily stores the inputted dial data, for example, for redial use.

Further, the CPU 4 is connected to the telephone lines L1 and L2 via a call incoming signal detection and judgement circuit 8 and performs necessary processings for transmitting and receiving talk signals and for talking. Still further, since a talk processing circuit 50 relating to talking is not directly related to the present invention, of which the detail explanation is omitted.

The CPU 4 performs predetermined processings according to the received input key data SDO, generates in series such as predetermined data stored in internal memories such as ROM and key data, as well as produces clock pulse CLK and key depression signals and sends out these signals to the switching circuit 32.

The power source circuit 6 is a stabilized power source circuit which receives electric power of AC 100V from a commercial power source and steps down to a DC voltage of about 6V for the apparatus. The output line of the power source circuit 6 is connected to a diode 38 through which electric power is supplied to the CPU 4 and the power source interruption detecting circuit 5 and further, through a diode 39 electric power is supplied to the respective circuits except for the CPU on the main substrate 11.

The power source circuit 7 is one which receives DC electric power of 45V from the telephone line and steps down the received voltage to a DC voltage of about 6V for the apparatus. The output line of the power source circuit 7 is connected to the cathode side of the diode 39 via a diode 40 and, like the diode 39, supplies electric power to the respective circuits within the apparatus. The power source circuit 7 becomes effective during power failure.

The power source interruption detecting circuit 5 detects the voltage of the power source circuit 7, in that, when the detected voltage drops below a predetermined voltage less than 5V, in other words when the power source interruption detecting circuit 5 detects a power source interruption caused by such as power failure, the power source interruption detecting circuit 5 generates a detection signal through which the respective switching circuits 32a, 32b and 32c in the switch circuit 32 are switched toward the remaining terminals as indicated by dotted lines to thereby switch the input at the side of the CPU 4 to the input at the side of the interface 2.

Accordingly, during power source interruption condition caused by such as power failure, the input key data inputted from the key board 1 can be sent out to the data converting circuit 33 via the switch circuit 32 by making use of electric power received from the telephone line.

Now, in the present invention, the wirings between the main substrate 11 and the panel substrate 12 are fundamentally limited to three signal lines connecting the interface 2 and the dialer 3 except for the wirings for supplying electric power to the panel substrate 12. Further, since the wiring at the ground (GND) side is assumed already completed at the side of power supply for the panel substrate, the illustration thereof is omitted.

As an alternative, four signal lines between the panel substrate and the main substrate can be introduced to send out the synchronous clock pulses SYN to the main substrate while providing the oscillation/initiating circuit 37 on the panel substrate. In this instance a serial transmission consisting of the serial data, serial clock pulses, synchronous clock pulses and key depression signals is performed.

Figure 2:
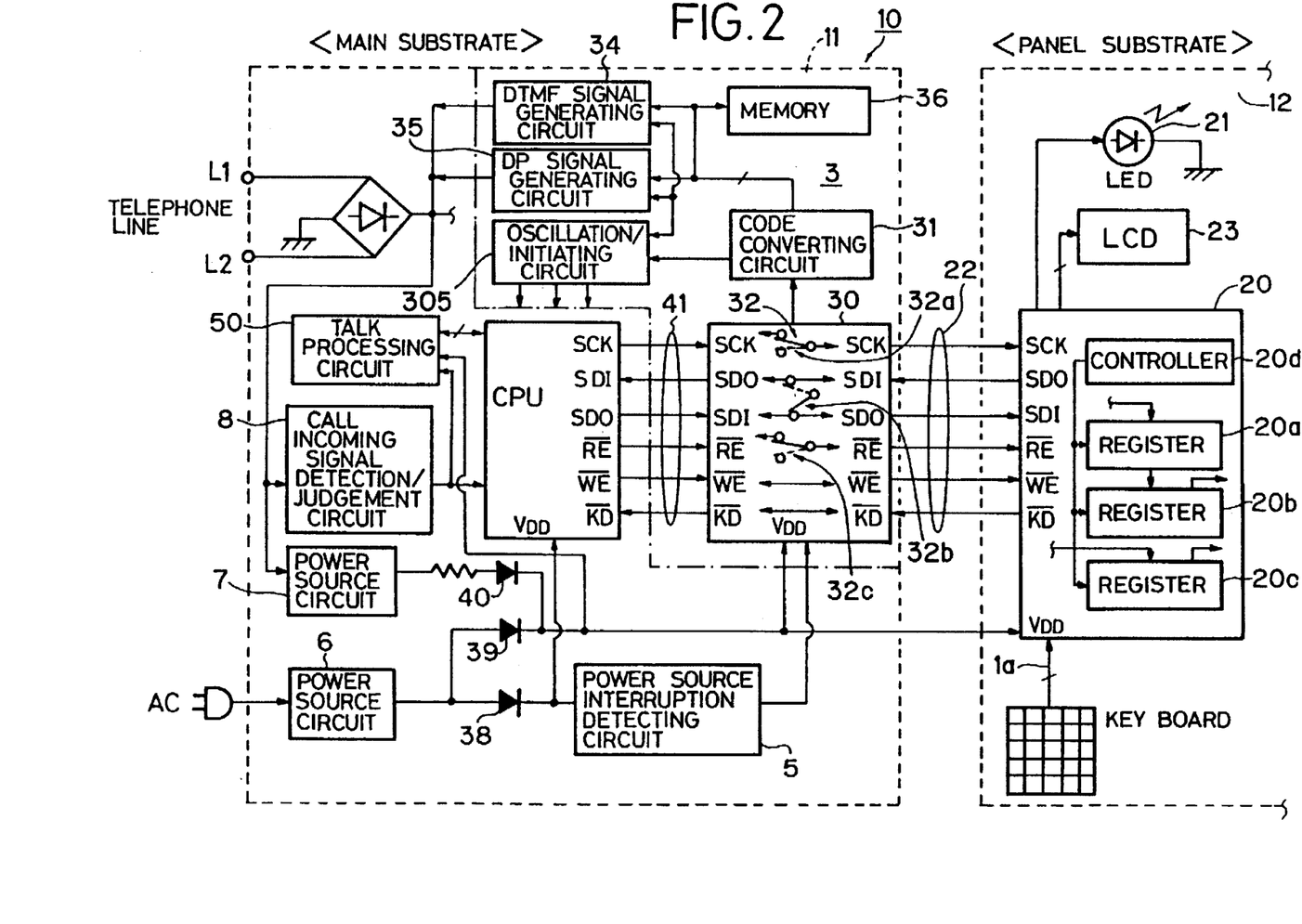
FIG. 2 is a block diagram of another embodiment to which the telephone apparatus according to the present invention is applied.

FIG. 2 is an embodiment wherein an LCD is mounted on the panel substrate and lines for transmitting display data from the CPU to the LCD are added. In the present embodiment, an interface 20 in place of the interface 2 is provided on the operation panel 12. Further, on the operation panel 12, LED 21 and LCD 23 for displaying operating condition of the apparatus are provided. On the other hand, at the side of the main substrate 11 a transit circuit 30 which performs data transmission and reception between the interface 20 and the CPU 4 is provided. Further, the illustration of the connection terminal unit 9 for connecting wiring lines 22 is omitted for the sake of explanation convenience of the wiring lines 22.

The wirings from the interface 20 to the dialer 3 are consisted by six wiring lines 22 of three control lines and three signal lines when uncounting the power source lines. The three control lines are consisted by a first line at terminal *KD (input line for key depression signal KD) constituting a key input interruption line, a second line at terminal *RE constituting a read control line and a third line at terminal *WE constituting a write control line. The three signal lines are constituted by a first line at terminal SDO-terminal SDI (input line for the input key data) constituting the serial transmission line from the interface 20 to the dialer 3, and a second line at terminal SDI-terminal SDO (output line of display data) constituting the serial transmission line from the dialer 3 to the interface 20 and a third line at terminal SCK (line for clock pulses CLK) constituting the clock supply line which supplies clock pulses from the dialer 3 to the interface 20. Further, "*" before respective reference symbols correspond to the over bars in the drawings and represent low level active signals.

The dialer 3 and the CPU 4 are similarly connected by six wiring lines 41 consisting of three control lines and three signal lines. The three control lines are similarly constituted by a first line at terminal *KD constituting a key input interruption line, a second line at terminal *RE constituting a read control line and a third line at terminal *WE constituting a write control line. The three signal lines are constituted by a first line at terminal SDO-terminal SDI constituting a serial transmission line from the dialer 3 to the CPU 4, a second line at terminal SDI-terminal SDO constituting a serial transmission line from the CPU 4 to the dialer 3 and a third line at terminal SCK constituting a clock pulse supply line which supplies clock pulses CLK from the dialer 3 to the interface 20.

Figure 4:
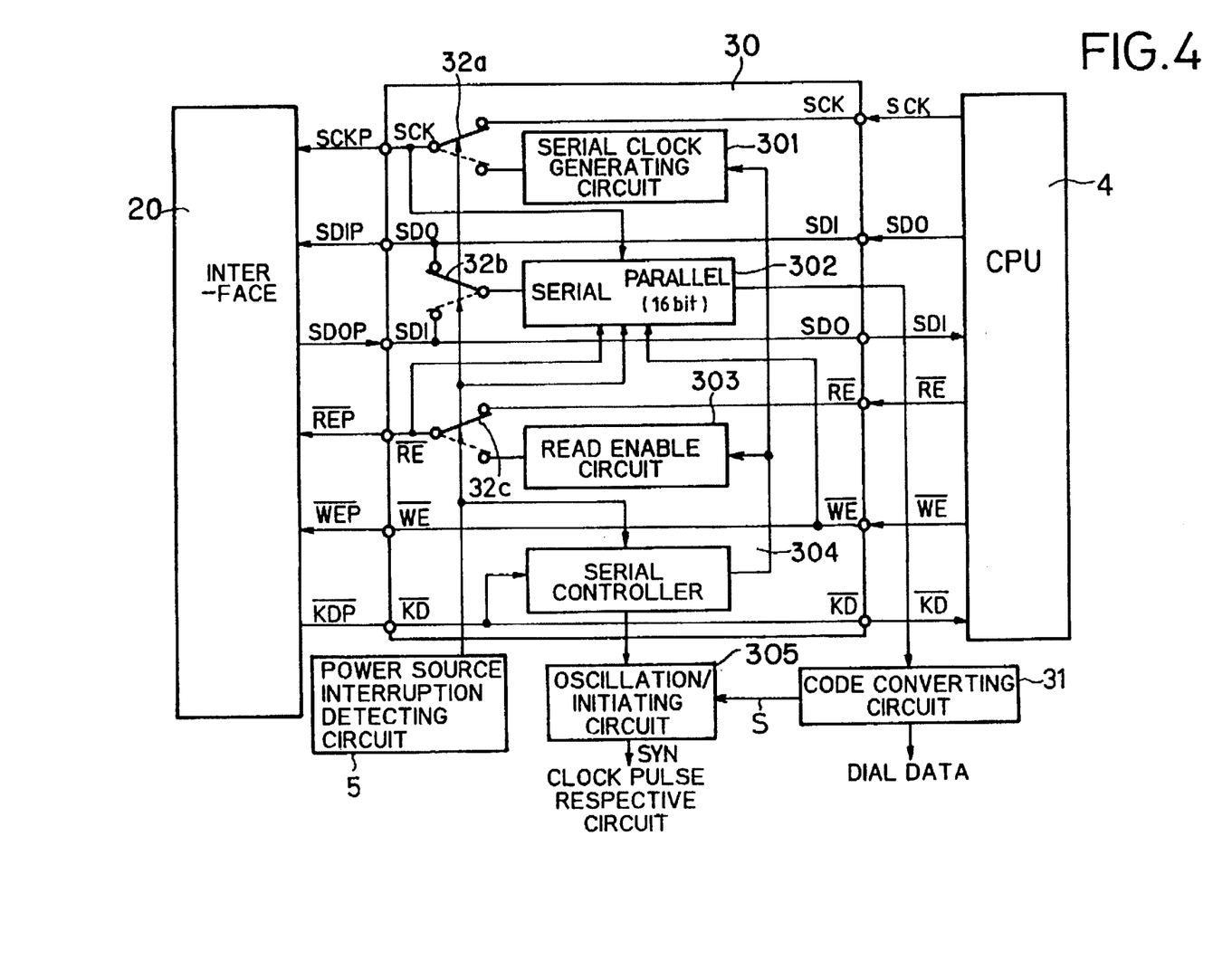
FIG. 4 is a detailed block diagram of the signal transmission and reception control circuit inside the dialer as shown in FIG. 2.

The transit circuit 30 and a code converting circuit 31 in the dialer 3 as illustrated in FIG. 4 correspond to the wirings 31a and 31b and the data converting circuit 33 as shown in FIG. 1. A serial clock generating circuit 301 (see FIG. 4) which corresponds to the switch circuit 32 and the clock generating circuit 2c is provided inside the transit circuit 30. The transit circuit 30 is one which sends out transmission data from the CPU 4 to the interface 20 and further sends out transmission data from the interface 20 to the CPU 4. Further, upon receipt of a detection output from the power source interruption detecting circuit 5, the transit circuit 30 switches the respective connection lines corresponding to the respective terminals including the SCK line, SDO line, SDI line and *RE line to their internal circuits by the switch circuit 32 provided inside thereof under a power source interruption condition. In order to enable a dial call origination during a power failure the respective line connections of the switching circuits 32a, 32b and 32c in the switch circuit 32 are switched to their internal circuits. During a power failure, the internal circuits in the transit circuit 30 are connected to the interface 20 via these switching circuits. During normal operating conditions, the respective lines within the dialer 3 are in a through connection condition in which the input side and the output side are simply connected. Namely, signals to be transmitted simply pass through the dialer 3.

Figure 3A:
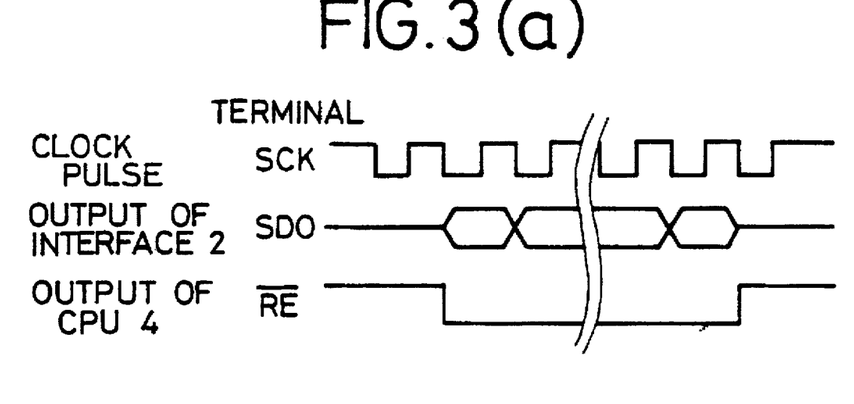
FIGS. 3(a)-3(c) are views for explaining a signal transmitting and receiving operation between the circuits at the panel substrate side and the circuits at the main substrate side in the embodiment as shown in FIG. 2.

The interface 20 includes inside thereof registers 20a, 20b and 20c and a controller 20d as shown in FIG. 2. The controller 20d sends out a key depression signal *KD from the key board 1 to terminal *KD as an interruption signal for the CPU 4, and then sets the bit data of the inputted key signal in the register 20a. The registers 20a, 20b and 20c are registers of 16 bits. When assuming that the key board 1 is constituted by a matrix of 5×5, 10 of the 16 bits are used for the key data, wherein 5 bits are allotted in the longitudinal direction and 5 bits in the lateral direction, and the remaining 6 bits are used for the other party's code or command code (see (c) in FIG. 3). In this instance, for example, the first 6 bits in the data represent the other party's code or the command code, the subsequent 5 bits represent the key input position in the row direction of the key board matrix, and the final 5 bits represent the key input position in the column direction thereof.

The data in the register 20a is set at the register 20b used for transmission at the timing of the subsequent clock pulse and the register 20a receives the subsequent key input. The data at the register 20b is sent out for the dialer 3 from the terminal SDO through the control of the controller 20d in synchronism with the clock pulse CLK received from the terminal SCK.

The register 20c is a register for signal receiving and stores 16 bits of data sent in series from the CPU 4. This data is sent out to the LCD 21 via an LCD driving circuit (not shown).

The controller 20d controls data transmission and reception of the data at the respective registers in response to the signals received at the terminal *RE and the terminal *WE.

The data transmission between the interface 20 and the CPU 4 is performed in response to a command from the CPU 4. Namely, when the CPU 4 receives a key input interruption signal from the interface 20 via the line at the terminal *KD and the dialer 3, the CPU 4 sends out a read enable signal *RE as illustrated in (a) in FIG. 3 to the controller 20d via the line at the terminal *RE and the dialer 3 to perform data readout. During the time when the *RE signal is received, the controller 20d sends out the data at the register 20b to the terminal SDI of the dialer 3 and transfers the same in series to the CPU 4 via the terminal SDO of the dialer 3. In this instance, a clock pulse CLK is at the same time sent out from the terminal SCK of the CPU 4 to the terminal SCK of the dialer 3 and is inputted to the terminal SCK of the interface 20 while passing through the dialer 3. As a result, the input key data is transferred in series from the register 20b in the interface 20 to the CPU 4 via the line at the terminal SDO through control of the controller 20d, which has received the read enable signal *RE, and in synchronism with the clock pulse CLK. FIG. 3(a) shows the signal transmission timing of the interface 20 in this instance.

Figure 3B:
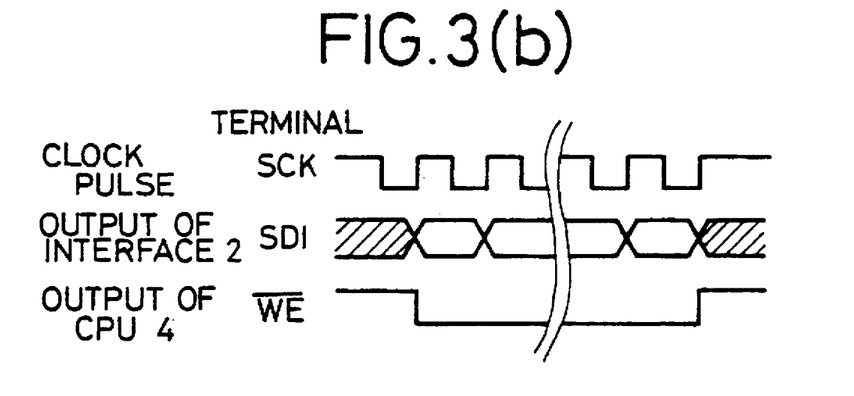
Figure 3C:
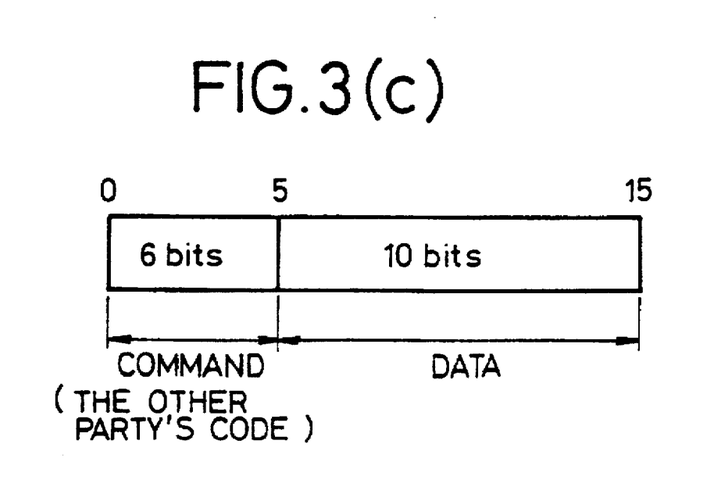

When there are display data, the CPU 4 sends out a write enable signal *WE as illustrated in FIG. 3(b) to the controller 20d via the line at the terminal *WE and the dialer 3, and writes data such as the display data at the register 20c. The CPU 4 sends out in series, together with the *WE signal, the data to be transferred from the terminal SDO to the terminal SDI of the dialer 3. The dialer 3 also sends out the same data to the terminal SDO. In the same manner as the above, at this instance a clock pulse CLK at the same time is sent out from the terminal SCK of the CPU 4 to the terminal SCK of the interface dialer 3 and is inputted to the terminal SCK of the interface 20 while passing through the dialer 3. As a result, the display data etc. are stored at the register 20c in the interface 20 through control of the controller 20d which has received the write enable signal *WE and in synchronism with the clock pulse. FIG. 3(b) shows the signal reception timing of the interface 20 in this instance. Further, the interface 20 decodes the other party's code based on the data stored in the register 20c, and since the decoded other party's code is directed to the first party, the interface 20 sends out the same to the LCD 23 via the LCD driver based on the display data following the other party's code. Still further, depending upon the nature of the other party's code, the same can be sent out to the LED 21.

In the same manner as in the FIG. 1 embodiment, the CPU 4 performs predetermined processings according to the input key data, generates predetermined code data which are stored in the internal memories such as the ROM, and sends out the same to the dialer 3. Further, the signal transmission between the dialer 3 and the CPU 4 is performed at the timing as illustrated in FIG. 3 in response to a command from the CPU 4. The CPU 4, at first, produces in series key data which correspond to many kinds of keys in response to serial input key data signals SDO which have been received from the interface 20. These produced key data are sent out to the dialer 3 according to the format as illustrated in FIG. 3(c) and by making use of the other party's bits as the code designating the dialer 3. In the same manner as the above, a write enable signal is sent out to the line at the terminal *WE. The dialer 3 receives in series the data from the terminal of the CPU 4 at the terminal SDI and sends out the same via the transit circuit 30 to the code converting circuit 31 such as for the dial data. The code converting circuit 31 decodes the other party's code, and since the decoded code is a dialer, the code converting circuit 31 converts the same into dial data and sends out the same to the memory 36, the DTMF generating circuit 34 and the DP generating circuit 35. At the same time, the code converting circuit 31 initiates the oscillation/initiating circuit 305 (which corresponds to the oscillation/initiating circuit 37 in FIG. 1).

Now, a dial data generating operation is explained with reference to FIG. 4.

FIG. 4 is a block diagram of the transit circuit 30, wherein for identification purpose of the terminals, the terminals connected at the side of the interface 20 are given the letter P after their symbols so as to distinguish over the terminals connected at the side of the CPU 4.

The transit circuit 30 is constituted by a serial clock generating circuit 301 which corresponds to the clock generating circuit 2c in FIG. 1, serial/parallel converting circuit 302, a read enable circuit 303 and a serial controller 304. The switching circuits 32a, 32b and 32c are illustrated in the connecting condition during a normal operating condition in which electric power from the power source circuit 6 is supplied in a normal state.

Under the normal operating condition the CPU 4 which has received a key input interruption signal (*KD signal) generates a write enable signal *WE via the line at the terminal *WE and sends out the same to the dialer 3, and further sends out a clock pulse CLK from the terminal SCK of the CPU 4 to the terminal SCK of the dialer 3. Still further, the CPU 4 outputs key data produced in response to the input key data. The write enable signal *WE and the clock pulse CLK are inputted into the serial/parallel converting circuit 302 and further, the key data transmitted from the CPU 4 is inputted into the serial/parallel converting circuit 302 via the terminal SDI. In the serial/parallel converting circuit 302 the transmitted key data are converted into parallel bits and sent out to the code converting circuit 31 wherein the received data are decoded. When the resultant decoded data do not designate the dialer 3, an initiating signal S is prevented from being sent out to the oscillation/ initiating circuit 305. As a result, the data converted by the code converting circuit 31 has no significance. Further, in response to generation of a read enable signal *RE via the line at the terminal *RE the CPU 4 receives the data from the interface 20, the read enable signal *RE is inputted into the serial/parallel converting circuit 302 and the operation of the serial/parallel converting circuit 302 is prevented.

When the resultant data decoded in the code converting circuit 31 is for the dialer 3, an initiating signal S is sent out to initiate the oscillation/initiation circuit 305, and a built-in oscillator in the oscillation/initiation circuit 305 is operated to generate a synchronous clock pulse SYN which is sent out such as to the DTMF generating circuit 34, the DP generating circuit 35 and the memory 36 provided within the dialer 3 so as to operate these circuits.

Now, since the data inputted to the terminal SDI of the CPU 4 at the side of the dialer 3 is wire-connected to the terminal SDO at the output side, the data is also sent out to the terminal SDI of the interface 20. However for the controller 20d at the side of the interface 20, the other party's code is not matched. Thus, controller 20d does not perform receiving and processing of the data from the CPU 4.

When the power source is interrupted, the switching circuits 32a, 32b and 32c are connected to the remaining terminals as illustrated by dotted lines. In this instance, the serial controller 304 operates in response to a power source interruption detecting signal from the power source interruption detecting circuit 5 and receives a key input interruption signal from the interface 20 via the line at the terminal *KD, and then initiates the serial controller 304, the read enable circuit 303, the serial clock generating circuit 301 and the oscillation/initiating circuit 305. Thereby, a clock pulse CLK is sent out from the terminal SCK to the interface 20. Further, upon receipt of an initiation signal of the serial controller 304 the read enable signal generating circuit 303 sends out a read enable signal to the terminal *REP. As a result, the interface 20 transfers the data at the register 20b to the terminal SDOP, and the transferred data are sent out to the serial/parallel converting circuit 302 and then to the code converting circuit 31. During the power source interruption, upon receipt of the initiation signal from the serial controller 304, the oscillation/initiating circuit 305 is activated regardless of the other party's code; therefore the data converted by the code converting circuit 31 operates effectively as a dial data.

In the FIG. 2 embodiment, the wirings between the main substrate 11 and the panel substrate 12 are limited to six signal lines. Further, as the connecting structure between the interface 2 or 20 and the main substrate 11, a connector as well as a direct joint to the terminals can be used. Also, many kinds of structures can be used for the wiring connection. Still further, for the CPU 4 a controller primarily constituted by a MCU or MPU can be used. Moreover, when the switches in the selection circuit are types which perform a switching operation in response to the input signal, the selection circuit need not be supplied with electric power both during a power failure and a normal operating condition.

I claim:

1. A telephone apparatus comprising:
   a keyboard including ten keys and symbol keys;
   a serial data generating circuit which generates serial input data corresponding to inputted keys on said keyboard in response to clock pulses;
   a key input signal generating circuit which generates a key input signal representing an input through a key in response to a signal from said keyboard;
   a panel substrate provided with said serial data generating circuit and said key input signal generating circuit and disposed at the side of an operation panel;
   a clock generating circuit which generates the clock pulses;
   a processor which receives the clock pulses, the key input signal and the serial input data, and outputs serial key data and control signals in parallel with the serial key data, wherein said serial key data and said control signals are produced in response to the serial input data and the clock pulses, or in response to the serial input data and other pulses that are generated in response to the clock pulses;
   either a dial pulse generating circuit or a dual tone multi frequency signal generating circuit;
   a selection circuit which receives the clock pulses from said clock generating circuit, the key input signal or a signal corresponding the key input signal, the serial input data, and the parallel output signals from said processor; outputs, in parallel with each other, the parallel signals from said processor during normal operation; and outputs, in parallel with each other, the clock pulses from said clock generating circuit, the key input signal or the signal corresponding to the key input signal, and the serial input data during a power source interruption;
   a data converting and producing circuit which produces dial data from the output signals received from said selection circuit;
   a main substrate provided with said processor, either said dial pulse generating circuit or said dual tone multi frequency signal generating circuit, said selection circuit, and said data converting and producing circuit;
   wiring through which the clock pulses, the key input signal, and the serial input data are inputted in parallel with each other to both said selection circuit and said processor; and
   a power source circuit which supplies electric power from a telephone line to either said dial pulse generating circuit or said dual tone multi frequency signal generating circuit, said clock generating circuit, and said data converting and producing circuit on said main substrate and the panel substrate.

2. A telephone apparatus according to claim 1, wherein one of the control signals corresponds to the key input signal, and said selection circuit receives, in parallel with each other, the parallel output signals from said processor at a first set of input terminals thereof, and further receives, in parallel with each other, the clock pulse from said clock generating circuit, the key input signal, and the serial input data at a second set of input terminals, and during normal operation outputs, in parallel with each other, the inputs at the first set of input terminals and during power source interruption outputs the inputs at the other set of input terminals.

3. A telephone apparatus according to claim 2, further comprising a power source interruption detecting circuit which detects a power source interruption and sends out the detection signal to said selection circuit to switch the connection therein to the second set of input terminals, and an initiation circuit which initiates one of said dial pulse generating circuit and said dual tone multi frequency signal generating circuit, wherein said power source interruption detecting circuit, said initiation circuit, and said clock generating circuit are provided on said main substrate, said initiation circuit is initiated by said data converting and producing circuit; and a wiring through which the clock pulse from said clock generating circuit is transferred to said panel substrate.

4. A telephone apparatus according to claim 2, further comprising a power source interruption detecting circuit which detects a power source interruption and sends out the detection signal to said selection circuit to switch the connection therein to the second set of input terminals, and an initiation circuit which initiates one of said dial pulse generating circuit and said dual tone multi frequency signal generating circuit, wherein said power source interruption detecting circuit, said initiation circuit, and said clock generating circuit are provided on said panel side substrate; and a wiring through which the clock pulse from said clock generating circuit is transferred to said main substrate.

5. A telephone apparatus according to claim 1, further comprising a display device provided on said panel side substrate; and a wiring which is designed to send out an output data from said processor to said display device therethrough, provided between said main substrate and said panel side substrate.

6. A telephone apparatus according to claim 5, further comprising a controller at said panel side substrate; wherein said processor is constituted primarily by a CPU, and wherein said CPU upon receipt of the key input signal sends out the clock pulse and a read control signal to control said controller, receives the serial input data in response to the clock pulse, and sends out the clock pulse and a write control signal to said panel side substrate to control the controller, and sends out display data for said display device to said panel side substrate.

7. A telephone apparatus according to claim 6, further comprising a transit circuit which during the normal operating condition receives the key input signal and the serial input data from said panel side substrate, passes and sends out the key input signal and the serial input data to said CPU, receives the read control signal, receives the write control signal and the display data from said CPU, and passes and sends out the read control signal, the write control signal, and the display data to said panel side substrate, wherein said selection circuit sends out the signals passing through said transit circuit to said data converting and producing circuit during a power failure.

* * * * *